(12) United States Patent
Nishimura et al.

(10) Patent No.: US 12,292,132 B2
(45) Date of Patent: May 6, 2025

(54) THERMOSTAT DEVICE AND METHOD FOR MANUFACTURING THERMOSTAT DEVICE

(71) Applicant: NIPPON THERMOSTAT CO., LTD., Kiyose (JP)

(72) Inventors: Tetsuya Nishimura, Kiyose (JP); Masayuki Numata, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 40 days.

(21) Appl. No.: 18/272,283

(22) PCT Filed: Nov. 11, 2021

(86) PCT No.: PCT/JP2021/041520
§ 371 (c)(1),
(2) Date: Jul. 13, 2023

(87) PCT Pub. No.: WO2022/163070
PCT Pub. Date: Aug. 4, 2022

(65) Prior Publication Data
US 2024/0084912 A1    Mar. 14, 2024

(30) Foreign Application Priority Data

Jan. 28, 2021 (JP) ................ 2021-012286

(51) Int. Cl.
*F16K 31/00* (2006.01)
*F01P 7/16* (2006.01)
*G05D 23/13* (2006.01)

(52) U.S. Cl.
CPC ............. *F16K 31/002* (2013.01); *F01P 7/16* (2013.01); *F16K 2200/30* (2021.08); *G05D 23/1333* (2013.01)

(58) Field of Classification Search
CPC ...... F16K 31/002; F16K 2200/30; F01P 7/16; G05D 23/1333
(Continued)

(56) References Cited

U.S. PATENT DOCUMENTS 4,288,031 A * 9/1981 Hass .................. G05D 23/1333
123/41.1
5,054,374 A * 10/1991 Scobie .................. F15B 15/125
92/120

(Continued)

FOREIGN PATENT DOCUMENTS

CA    3133196 A1    10/2020
JP    2005-156307 A    6/2005
(Continued)

OTHER PUBLICATIONS

PCT/ISA/210, "International Search Report for PCT International Application No. PCT/JP2021/041520," Dec. 7, 2021.
(Continued)

*Primary Examiner* — Minh Q Le
(74) *Attorney, Agent, or Firm* — HAUPTMAN HAM, LLP

(57) ABSTRACT

Provided are a thermostat device and a method for manufacturing the same, capable of minimizing an increase in size of the thermostat device, and where a seal member is easily assembled and cost can be minimized. This thermostat device includes a housing, attached to a mounting hole of a counterpart member, that has a flow path for a coolant formed therein, a seal member that creates a liquid-tight seal between the counterpart member and the housing, a thermo-element that expands and contracts in accordance with the coolant temperature, a valve body that opens and closes the flow path due to the expansion and contraction of the thermo-element, and a coil spring that biases the valve body in a closing direction, the housing having formed therein a
(Continued)

deformed annular groove into which the seal member fits, and the seal member having a perfectly circular shape in a natural length state.

4 Claims, 7 Drawing Sheets

(58) Field of Classification Search
USPC ........ 137/468; 277/598, 910, 637, 591, 578, 277/616
See application file for complete search history.

(56) References Cited

U.S. PATENT DOCUMENTS

| | | | | |
|---|---|---|---|---|
| 5,979,778 | A * | 11/1999 | Saur | F01P 7/16 236/34.5 |
| 5,992,755 | A * | 11/1999 | Kuze | G05D 23/1333 236/34.5 |
| 6,772,959 | B2 * | 8/2004 | Cardinali Ieda | G05D 23/022 236/34.5 |
| 12,110,817 | B2 * | 10/2024 | Nishimura | G05D 23/02 |
| 2005/0109113 | A1 | 5/2005 | Baba | |
| 2006/0163373 | A1 | 7/2006 | Inoue | |
| 2011/0214626 | A1 * | 9/2011 | Watanabe | F01P 7/167 123/41.1 |
| 2012/0319028 | A1 * | 12/2012 | Kusakabe | G05D 23/022 251/366 |
| 2013/0112763 | A1 * | 5/2013 | Roman | F16K 31/002 236/101 R |
| 2013/0180477 | A1 * | 7/2013 | Nakajima | F16K 31/025 123/41.05 |
| 2017/0074155 | A1 | 3/2017 | Shimomura | |
| 2019/0153927 | A1 * | 5/2019 | Inoue | F01P 7/165 |
| 2022/0154627 | A1 | 5/2022 | Nishimura | |
| 2023/0383689 | A1 * | 11/2023 | Nguyen | F01P 7/16 |
| 2024/0068588 | A1 * | 2/2024 | Nishimura | F01P 7/16 |

FOREIGN PATENT DOCUMENTS

| | | |
|---|---|---|
| JP | 2005-330920 A | 12/2005 |
| WO | 2015/198674 A1 | 12/2015 |
| WO | 2020/203040 A1 | 10/2020 |

OTHER PUBLICATIONS

Extended European Search Report for European Application No. 21923075.2 dated Nov. 4, 2024; 8 pp.

* cited by examiner

Prior Art

Prior Art

Prior Art

THERMOSTAT DEVICE AND METHOD FOR MANUFACTURING THERMOSTAT DEVICE

RELATED APPLICATIONS

The present application is National Phase of International Application No. PCT/JP2021/041520 filed Nov. 11, 2021, and claims priority from Japanese Application No. 2021-012286, filed Jan. 28, 2021, the disclosure of which is hereby incorporated by reference herein in its entirety.

TECHNICAL FIELD

The present invention relates to a thermostat device and a method for manufacturing a thermostat device.

BACKGROUND ART

The thermostat device is disposed on the inlet side or the outlet side of the vehicle engine, for example, and is used to open and close a cooling path connecting the engine and the radiator to control the temperature of the coolant circulating through the engine.

As disclosed in patent literature 1 (see FIG. 5), for example, such a thermostat device includes a housing 60 inside which a flow path leading to a cooling path is formed, a thermo-element 51, one end of which is inserted in the housing 60, expanding and contracting, depending a temperature, a valve body 52 opening or closing the flow path in response to the expansion and contraction of the thermo-element 51, and a coil spring 53 biasing the valve body 52 toward a closing direction. The thermostat device is attached to a mounting hole of a counterpart member. Then, the housing 60 and the counterpart member are fastened by bolts, and the housing 60 and the counterpart member are sealed liquid-tightly with a sealing member 71.

CITATION LIST

Patent Literature

PTL 1: JP-A-2005-330920

SUMMARY OF INVENTION

Technical Problem

As shown in FIG. 6, when the annular groove 70 into which the seal member 71 fits is circular in the housing 60, a bolt hole 63a for inserting a fastening bolt is provided outside the annular groove 70, and a flange 63 for forming the bolt hole 63 a is formed in a way to protrude outward from the body portion of the housing 60.

Thus, when the flange 63 is provided to protrude outward from the outer periphery of the circular annular groove 70, the housing 60 is enlarged to increase the size of the thermostat device.

In contrast, as shown in FIG. 7, when the annular groove 70 is formed in a deformed and vertically-long shape, and the bolt holes 63a, 63a are provided so as to sandwich the annular groove 70 from both sides in the short-length direction of the annular groove 70, the interval (fastening pitch) between the pair of bolt holes 63a, 63a is reduced, and the thermostat device can be miniaturized. However, as shown in FIG. 7, when the deformed seal member 71, having the same shape as that of the annular groove 70, is fitted into the annular groove 70 of the irregular shape, the seal member 71 is provided with a positioning protrusion 71a so that a portion having a large curvature of the seal member 71 is fitted to a portion whose curvature of the annular groove 70 is large and a portion having a small curvature of the seal member 71 is fitted to a portion whose curvature of the annular groove 70 is small, and the annular groove 70 is provided with a groove 70a for fitting the positioning protrusion 71a. This structure causes the directionality in the seal member 71. Thus, when the seal member 71 is assembled, the positioning protrusion 71a is fitted into the positioning groove 70a to then fit the body portion of the seal member 71 into the annular groove 70, thereby complicating the assembly work of the seal member 71. In addition, a dedicated seal member 71 must be provided to conform to the shape of the annular groove 70. That is, since the seal member 71 becomes a dedicated article corresponding to the shape of the annular groove 70, the seal member 71 cannot be shared by different types of thermostat devices having annular grooves 70 of different shapes, and the versatility of the seal member 71 is reduced to increase the cost.

The present invention has been made by paying attention to the above points. It is an object of the present invention to provide a thermostat device and a method for manufacturing a thermostat device capable of suppressing an increase in the size of a thermostat device, also having an excellent assemblability of a seal member, and capable of suppressing costs.

Solution to Problem

A thermostat device according to the present invention to solve the above-described problem includes
   a housing that is attached to a mounting hole of a counterpart member and in which a coolant flow path is formed,
   a seal member that seals liquid-tightly between the counterpart member and the housing,
   a thermo-element, one end of which is inserted inside the housing, that performs an extension and contraction operation in accordance with the coolant temperature,
   a valve body that opens and closes the flow path by the expansion and contraction of the thermo-element; and
   a biasing member that biases the valve body in a closing direction, wherein the housing is provided with a deformed annular groove to which the seal member is fitted, the seal member circular in shape in a natural length state.

In order to solve the above-described problem, a method for manufacturing a thermostat device according to the present invention is a method that includes a housing having a cooling liquid flow path formed therein, a thermo-element having one end disposed into the housing and expanding/contracting in accordance with the temperature of the cooling liquid, a valve body for opening/closing the flow path by the expansion/contraction of the thermo-element, and a biasing member for biasing the valve body in a closing direction, wherein a deformed annular groove is formed in the housing for fitting a seal member, and the sealing member circular in shape in a natural length state.

According to the thermostat device and the method of manufacturing the thermostat device, since the annular groove has a deformed shape and is not circular, a narrow width portion and a wide width portion are formed against the direction of a straight line passing through the center of the annular groove. Because of this structure, the fastening pitch can be shortened by forming the bolt holes through which the fastening bolts are inserted on both sides of the narrow width portion. Thus, an increase in the housing size can be suppressed, thus increasing the size of the thermostat device.

In addition, to the annular groove that is not circular, the seal member circle-shaped in a natural length state is fitted, and the seal member follows the shape of the annular groove by elastically deforming. Thus, by using the seal member circular in shape at a natural length, the seal member has no directionality, and the seal member is fitted into the annular groove from any position of the seal member, which can improve the assemblability.

Further, a circular-shaped seal member can be fitted to other different-shaped annular grooves as far as the circumference is the same as that of the circular-shaped seal member. This eliminates the need to prepare a shape-difference seal member depending on the type of thermostat, reduces the number of dedicated components (which means the seal member can be used in a general-purpose way), and reduces costs.

In the thermostat device, a pair of bolt holes are formed on the housing through which a pair of bolts is inserted for fastening the housing and the counterpart member thereof, the annular groove is formed to be elliptical or rounded-rectangular, and the pair of bolts holes may be disposed so as to sandwich the annular groove from both of the short-length sides of the annular groove.

As aforementioned, the fastening pitch, the distance between the mounting holes, can be easily reduced to miniaturize the thermostat device by disposing the bolt holes on both sides of the short-length direction of the annular groove by forming the annular groove to be vertically long. Further, when the annular groove is elliptical or rounded rectangular, a seal member circular in shape in a state of natural length is easily fitted to the deformed-shaped annular groove.

Further, the thermostat device includes a frame that holds one end of the biasing member, the housing includes a hollow body having an opening at one end thereof in which one end of the thermo-element is disposed and a pair of legs, standing up at the opening edge of the body, hold the frame at the tip of the legs. The legs may be located inside the annular groove at both longitudinal ends of the annular groove. This structure allows easy allocation of the legs while shortening the fastening pitch.

Advantageous Effects of Invention

The thermostat device and the method for manufacturing the thermostat device according to the present invention allow for achieving suppression of enlargement of the thermostat device, excellent mountability of the seal member, and reduced cost thereof.

DESCRIPTION OF EMBODIMENT

Figure 1:
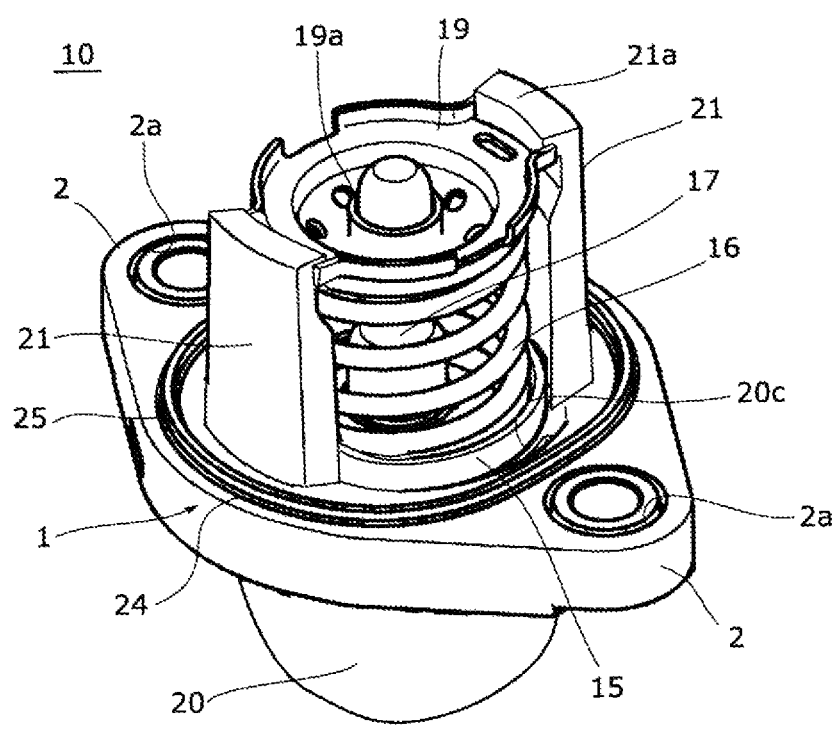
FIG. 1 is a perspective view of an example of a thermostat device according to the present invention viewed from the tip end side of the legs.
Figure 2:
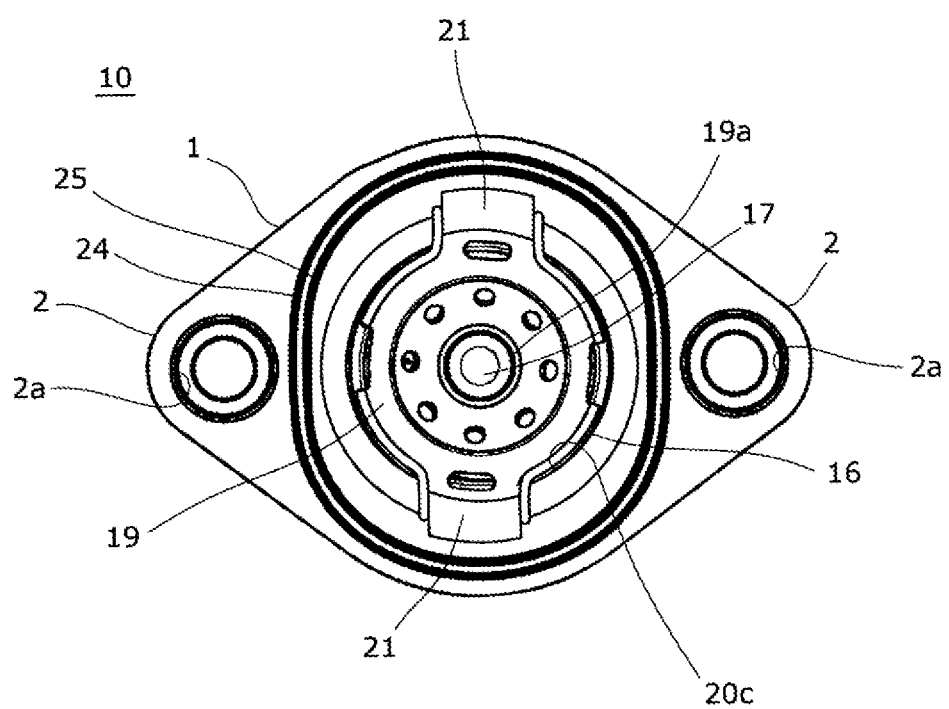
FIG. 2 is a bottom view of an example of the thermostat device according to the present invention.
Figure 3:
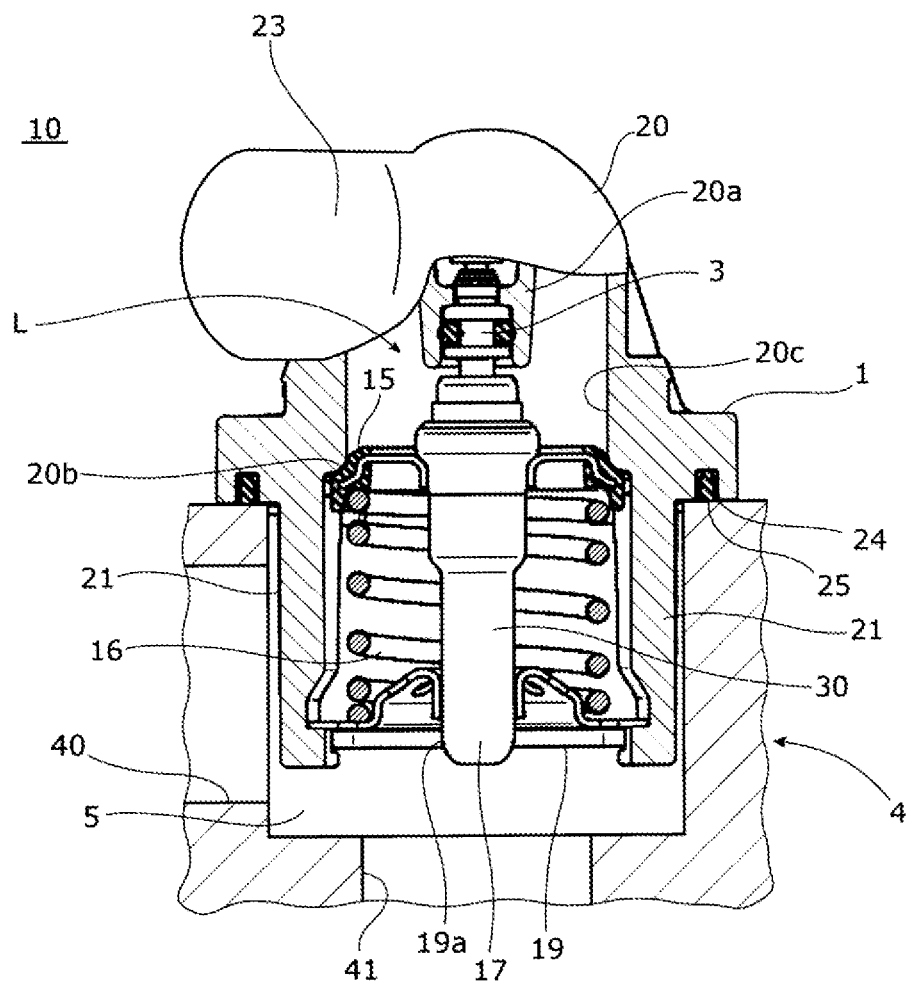
FIG. 3 is a partial cross-sectional view of an example of the thermostat device according to the present invention, illustrating a state where the thermostat device is attached to a counterpart member.

An embodiment of a thermostat device according to the present invention will be described based on the drawings below. The thermostat device 10 according to the embodiments shown in FIGS. 1 to 3 is used in a coolant system of an engine, for example. Specifically, the thermostat device 10 is disposed at an inlet or outlet side of a coolant path connecting a radiator with the engine and controls the temperature of the coolant circulating through the engine by opening and closing the coolant path depending on the temperature of the coolant.

The thermostat device 10 includes a hollow housing 1 forming a flow path L leading to the cooling path inside, as shown in FIG. 3, a thermo-element 17 one end of which is disposed in the housing 1, a valve body 15 formed on the outer periphery of the thermo-element opening and closing the flow path L, a coil spring 16 as a biasing member biasing the valve body 15 in the closing direction, and a frame 19 holding one end of the coil spring 16. For the convenience of description, the upper and lower sides of the thermostat device shown in FIG. 3 are simply referred to as "the upper" and "the lower."

In the present embodiment, the housing 1 is made of synthetic resin. The housing 1 is provided with a body 20 with a capped nearly-cylinder shape at whose lower end an opening 20c is formed, a pair of legs 21, 21 standing up from the opening edge of the body 20 and extending downward facing each other, a connecting port 23 of the radiator side formed at the top of the body 20, and a pair of flanges 2, 2 protruding outward from the lower outer periphery of the body 20.

The housing 1 is attached to the counterpart member 4 with the legs 21 inserted in mounting holes 5 of the counterpart member 4. An engine-side connecting port 40 and a bypass-side connecting port 41 are formed on the counterpart member 4. The flow path L in the housing 1 communicates the radiator-side connecting port 23 and the engine-side connecting port 40 via mounting hole 5. As described above, the flow path L leads to a coolant path connecting the engine and the radiator and constitutes part of the cooling path.

Meanwhile, the bypass-side connecting port 41 communicates with the engine-side connecting port 40 through the mounting hole 5, and the communicating portion constitutes part of a bypass path that circulates the coolant, not passing the radiator, through the engine.

For example, when the thermostat device 10 is disposed to the inlet side of the engine of a vehicle, the thermostat device 10 is attached to the water pump that supplies the coolant to the engine. In this case, the member of the water pump to which the thermostat device 10 is attached is the counterpart member. It is to be noted that the thermostat device 10, needless to say, may be disposed at the outlet side of the engine of a vehicle.

As shown in FIG. 2, a bolt hole 2a is respectively formed on the pair of flanges 2, 2. Metal sleeves (without reference sign) are press-inserted into the bolt holes 2*a*, and bolts (not shown) are inserted therethrough for mounting the thermostat device 10 to the counterpart member 4. An annular groove 24 is formed at the lower edge of the opening located inside the bolt holes 2*a* of the body 20 so as to surround the opening 20*c*, and a seal member 25 is attached to the annular groove 24. The seal member 25 seals between the housing 1 and the counterpart member 4 and prevents the coolant flowing in the housing 1 and the mounting hole 5 from leaking outside, with the thermostat device 10 being attached to the counterpart member 4.

The inside (interior area) of the seal member 25 on the body 20 defines the inside of the housing 1. An annular valve seat 20*b* is formed on the inner periphery just above the lower end opening edge of the body 20 located inside the housing 1. The flow path L is opened and closed by the valve body 15 unseated from and seated on the valve seat 20*b*.

The upper end of the thermo-element 17 is inserted into the inside of the housing 1. The thermo-element 17 is disposed to align with the axial line at the axis of the body 20. The thermo-element 17 includes an element case 30 inside which thermal expansion material such as wax is enclosed, and a piston 3 is inserted into the element case 30 retractably.

When the temperature of the coolant surrounding the element case 30 rises and the thermally expanding material inside is warmed to expand, the piston 3 exits from the element case 30, and the thermo-element 17 extends. On the contrary, when the temperature of the coolant surrounding the element case 30 goes down and the thermally expanding material inside is cooled to contract, the piston 3 enters the element case 30, and the thermo-element 17 contracts. Thus, the thermo-element 17 acts extending and contracting operations depending on the temperature of the coolant.

The tip end of the piston 3 located at the upper end of the thermo-element 17 fits with the cylindrical-shaped boss 20*a* formed at the inside top portion of the body 20. Thus the upward translation of the piston 3 against the housing is blocked. The extending and contracting operation causes the element case 30 to move upward and downward without changing the position of the piston 3 against the housing 1.

The valve body 15 is fixed on the outer periphery of the element case 30, whereby the valve body 15 moves up and down with the element case 30 accompanying the extending and contracting motion of the thermo-element 17. When the valve body 15 moves downward due to the extension of the thermo-element 17, the communication of the flow path L is allowed because the coolant can flow through the space made by the unseating of the valve body 15 from the valve seat 20*b*. On the contrary, when the valve body 15 moves upward and seats on the valve seat 20*b* due to the contraction of the thermo-element 17, the communication of the flow path L is blocked. Thus the valve body 15 opens and closes the flow path L in this manner.

The upper end of the coil spring 16 is in contact with the backside of the valve body 15. The coil spring 16 is disposed to surround the periphery of the thermo-element 17. The lower end (one end) of the coil spring 16 is held by the frame 19.

The frame 19 is hooked at the tip end portion of the pair of legs 21, 21 formed in the housing 1 and prevented from moving downward against the housing 1. A penetrating hole 19*a* is formed at the center of the frame 19. The element case 30 can freely upward and downward go through the penetrating hole 19*a*. That is, the element case 30 is movable up and downward against the frame 19.

The coil spring 16 is a compressive spring and is disposed between the valve body 15 and the frame 19 in a compressed state. Thus, the valve body 15 is biased upward (to the valve seat 20*a*) by the coil spring 16. In this configuration, when the temperature of the coolant around the thermo-element 17 rises high and the thermo-element 17 extends, the valve body 15 moves downward against the biasing force of the coil spring 16 and is unseated from the valve seat 20*b*. Meanwhile, when the temperature of the coolant around the thermo-element 17 becomes low and the thermo-element 17 contracts, the valve body 15 moves upward by the biasing force of the coil spring 16 to approach the valve seat 20*b*.

As shown in FIG. 2, an annular groove 24 formed on the housing 1 is rounded rectangular and has a vertically-long shape in the present embodiment. A pair of flanges 2, 2 are provided so as to protrude outward from the longitudinal side of the annular groove 24. As described above, bolt holes 2*a* are formed on each of the pair of flanges 2, 2. Thus the pair of bolt holes 2*a*, 2*a* are disposed as to sandwich the annular groove 24 from both sides of the short direction of the annular groove 24. The pair of legs 21, 21 are disposed inside the annular groove 24 and on the position corresponding to both ends of the longitudinal direction of the annular groove 24.

Figure 4:
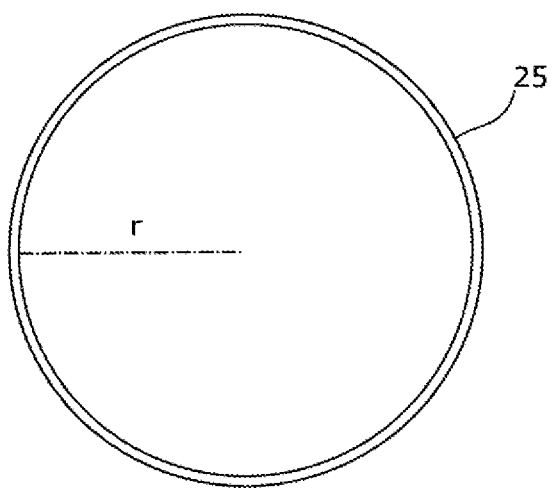
FIG. 4 is a plan view illustrating the shape of a seal member of the thermostat device in a natural length state according to the present invention.
Figure 5:
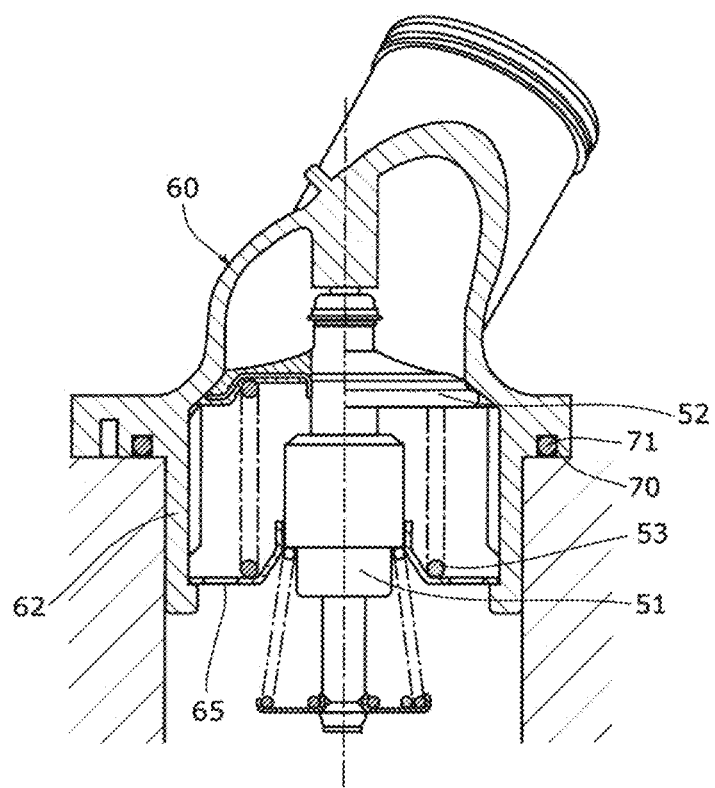
FIG. 5 is a partial cross-sectional view of a conventional thermostat device.
Figure 6:
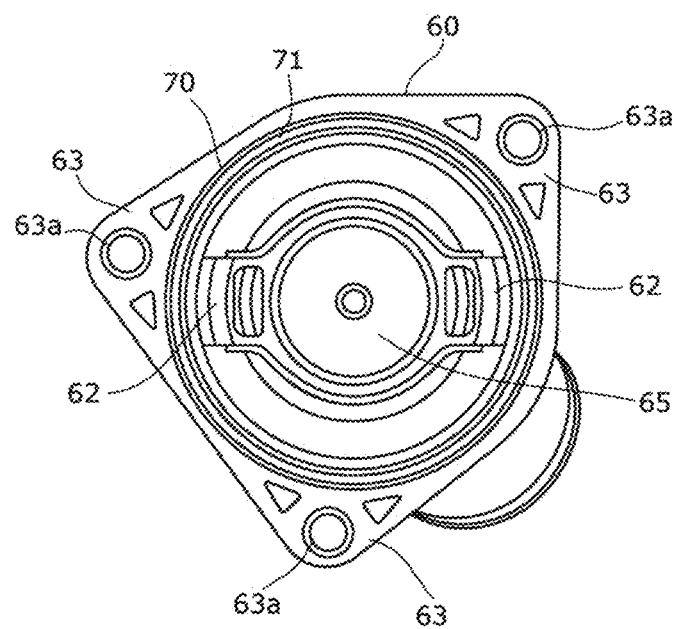
FIG. 6 is a bottom view of the thermostat shown in FIG. 5.

A seal member 25 to be fitted to the annular groove 24 is made of an elastic material such as rubber and is circular in shape in the state of natural length, as shown in FIG. 4. The state in which the seal member 25 is at its natural length (natural length state) refers to the state in which the seal member 25 is not compressed or elongated and no load is applied to the seal member 25, which can also be described as the cavity shape of the mold that forms the seal member 25. The seal member 25 is perfectly circular in shape if the seal member 25 is perfectly circular in plan view when viewed as a whole. For example, protrusions may be formed on the inner or outer circumference of the seal member 25, arranged in the circumferential direction.

The circumferential length (circumferential length) of the seal member 25 is the same as the circumferential length (circumferential length) of the annular groove 25.

As described above, the thermostat device 10 according to the present invention includes a housing 1 attached to the mounting hole 5 of the counterpart member 6 and having a flow path L for the coolant formed inside, the seal member 25 between the counterpart member 4 and the housing 5 in a liquid-tight manner, the thermo-element 17 whose one end is formed inside the housing 1, performing expanding and contracting operations depending on the temperature of the coolant, the valve body 15 that opens and closes the flow path L by the expanding and contracting operations of the thermo-element 17, and the coil spring 16 (a biasing member) biasing the valve body 15 in the closing direction. A deformed annular groove 24 is formed in the housing 1 to which the seal member 25 is fitted, and the seal member 25 is perfectly circular in shape in a state of natural length.

In the above configuration, since the annular groove 24 is deformed and not perfectly circular in shape, portions are formed having a narrower width and a wider width of a straight line direction passing through the center of the annular groove 24. This configuration makes it possible to shorten the fastening pitch (distance between the bolt holes 2*a*) by providing the flanges 2 on both sides of the narrow width portion and forming the bolt holes 2*a* in the flanges, thereby reducing the size of the housing 1, which in turn enlargement of the size of the thermostat device 10 can be inhibited.

The shape of the seal member 25, before being fitted in the annular groove 24, is perfectly circular in a state of natural length as shown in a plan view in FIG. 4. The circumference of the seal member 25 in natural length $2\pi r$ (r is the radius of the seal member 25 in the perfect circular shape) is equivalent to the circumference of the annular groove 24. Since the seal member 25 is made of rubber, for example, and is elastic, the seal member 25 can be fitted into the annular groove 24 by deforming to fit the shape of the annular groove even if the shape of the seal member is different from that of the annular groove 24.

Figure 7:
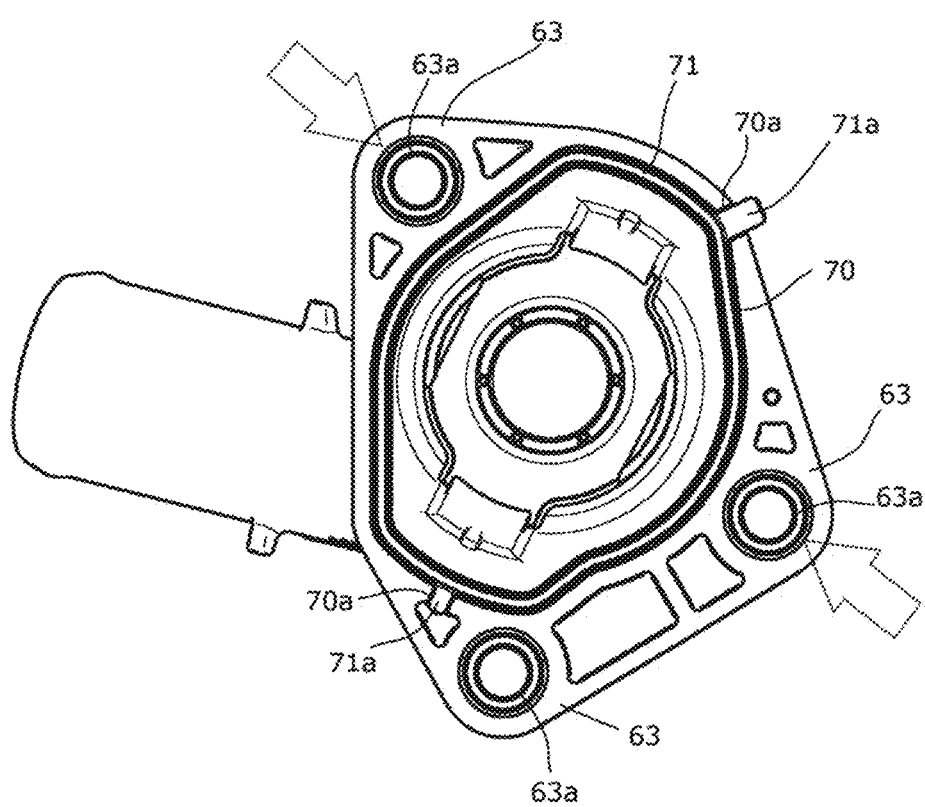
FIG. 7 is a bottom view of another conventional thermostat device.

Thus, even if the annular groove 24 is not a perfect circle, by forming the shape of the seal member 25 to be a perfect circle before fitting it into the annular groove 24, the seal member 25 becomes not directional. As a result, the conventional positioning protrusions 71a (FIG. 7) are no longer necessary, and the seal member 25 can be fitted into the annular groove 24 from any position, thus improving the assemblability of the seal member 25.

Further, a seal member 25 having a perfectly circular shape in a state of natural length can be fitted into an annular groove having a different shape from that of the annular groove 24 shown in FIG. 2 if the annular groove has the same circumference equal to $2\pi r$ of the circumference of the seal member 25. This eliminates the need to prepare the seal members 25 of different shapes for different types of the thermostat devices 10, and reduces the number of dedicated parts, thereby improving the versatility of the seal members 25 and reducing costs.

In the portions of wider width in the straight line direction passing through the center of the annular groove 24, the interior space of the housing 1 can be bulged in the same direction to form a bulge. When the bulge is disposed to face the connecting port 40 of the engine side, the pressure loss of the coolant passing through the housing 1 can be reduced. In contrast, when the bulge is disposed to the opposite side of the connecting port 40 of the engine side, in the case the thermostat 10 is disposed at the inlet side of the engine, the mixing is appropriately performed of the low-temperature coolant passing through the radiator flowing in from the connecting port 23 of the radiator side and the high-temperature coolant not passing through the radiator flowing in from the connecting port 41 of the bypass side.

The annular groove 24 is rounded-rectangular in shape in the thermostat device 10 according to the present embodiment. When the annular groove 24 is formed vertically long as above, the fastening pitch can be easily shortened and the thermostat device 10 can be miniaturized by providing the bolt holes 2a on both sides in the short-length direction of the annular groove 24. Further, by forming the annular groove 24 in a rounded rectangular shape, the annular groove 24 becomes a relatively simple shape having fewer changing curvature parts even though not perfectly circular, so that the seal member 25 is easily fitted even in the case the seal member 25 having the perfectly circular shape in the natural length state is fitted to a deformed annular groove 24.

The thermostat device 10 according to the present embodiment is provided with a frame 19 that supports one end of the coil spring (a biasing member) 16. Further, the housing 1 includes a hollow body 20 having an opening 20c at one end thereof, in which one end of the thermo-element 17 is inserted, and a pair of legs 21, 21 standing up at the opened edge of the body 20 and supporting the frame 19 at the tip end portion thereof. The pair of legs 21, 21 are located inside the annular groove 24 on both sides of the longitudinal direction end of the annular groove 24, whereby the legs 21 are easily disposed with shortening the fastening pitch.

However, the arrangement of the legs is not limited to the above and can be changed adequately. Further, the number of legs is not limited to a pair (two) and, for example, more than three legs may be provided with an equal space along the circumferential direction of the valve seat 20b. The one end of the coil spring (the biasing member) 16 may be supported by the counterpart member 4 by eliminating the legs 21.

Further, the shape of the annular groove 24 is not limited to rounded rectangular and may be deformed shapes. For example, the annular groove may be elliptic and, in this case, equivalent effects can be obtained compared to the case where the annular groove is rounded rectangular. As described above, the deformed shape means a shape other than a perfect circle, and includes polygons, rounded polygons, circles having a partially cut part, teardrop shapes, etc., in addition to rounded rectangles and ellipses.

The number of flanges 2 and bolt holes 2a can be changed appropriately, not limited to those shown in drawings.

The preferable embodiment of the present invention is described in detail above; modifications, transformations, and alterations are possible as far as not departing from the scope of the claims.

LIST OF REFERENCE SIGNS

1 Housing
2 flange
2a bolt hole
3 piston
4 counterpart member
5 mounting hole
10 thermostat device
15 valve body
16 coil spring (biasing member)
19 frame
20 body
20a boss
20b valve seat
21 legs
24 annular groove
25 seal member
L flow path

The invention claimed is:
1. A thermostat device, comprising:
a housing attached to a mounting hole of a counterpart member and formed with a flow path of a coolant therein,
a seal member that seals liquid-tightly between the counterpart member and the housing,
a thermo-element, one end of which is inserted inside the housing, that performs an extension and contraction operation in accordance with the coolant temperature,
a valve body that opens and closes the flow path by the expansion and contraction of the thermo-element; and
a biasing member that biases the valve body in a closing direction, wherein
the housing is provided with a deformed annular groove to which the seal member is fitted, the seal member includes an elastic member having a circumferential length equivalent to a circumferential length of the annular groove, and the seal member is perfectly cir- cular in shape in a natural length state and deforms to fit the shape of the annular groove when fitted into the annular groove.

2. The thermostat device recited in claim 1, wherein a pair of bolt holes are formed on the housing through which a pair of bolts is inserted for fastening the housing and the counterpart member thereof, the annular groove is formed to be elliptical or rounded-rectangular, and the pair of bolts holes is disposed so as to sandwich the annular groove from both of the short-length sides of the annular groove.

3. A thermostat device, comprising:
a housing attached to a mounting hole of a counterpart member and formed with a flow path of a coolant therein,
a seal member that seals liquid-tightly between the counterpart member and the housing,
a thermo-element, one end of which is inserted inside the housing, that performs an extension and contraction operation in accordance with the coolant temperature,
a valve body that opens and closes the flow path by the expansion and contraction of the thermo-element; and
a biasing member that biases the valve body in a closing direction, wherein
the housing is provided with a deformed annular groove to which the seal member is fitted, the seal member circular in shape in a natural length state,
a pair of bolt holes are formed on the housing through which a pair of bolts is inserted for fastening the housing and the counterpart member thereof, the annular groove is formed to be elliptical or rounded-rectangular, and the pair of bolts holes is disposed so as to sandwich the annular groove from both of the short-length sides of the annular groove, and
the thermostat device further comprises:
a frame that holds one end of the biasing member,
wherein the housing includes a body being hollow and having an opening at one end thereof on which one end of the thermo-element is inserted and a pair of legs, standing up at the opening edge of the body that holds the frame at the tip of the legs, and the pair of legs is located inside the annular groove on both longitudinal ends of the annular groove.

4. A method for manufacturing the thermostat device, comprising:
a housing having a cooling liquid flow path formed therein; a thermo-element having one end inserted into the housing and expanding and contracting in accordance with the temperature of the cooling liquid;
a valve body for opening and closing the flow path by the expansion and contraction operation of the thermo-element; and
a biasing member for biasing the valve body in a closing direction,
wherein the housing is provided with a deformed annular groove, and secondary a sealing member having a circumferential length equivalent to a circumferential length of the annular groove, the sealing member being made of an elastic member and being perfectly circular in shape in a natural length state is deformed to fit the shape of the deformed annular groove and fitted in the deformed annular groove.

* * * * *